United States Patent [19]

English

[11] Patent Number: 5,440,972
[45] Date of Patent: Aug. 15, 1995

[54] PORTABLE BEVERAGE BREWING DEVICE

[76] Inventor: Philip H. English, P.O. Box 1605, Avon, Colo. 81620

[21] Appl. No.: 259,960

[22] Filed: Jun. 14, 1994

Related U.S. Application Data

[63] Continuation-in-part of Ser. No. 103,860, Aug. 9, 1993, abandoned, which is a continuation-in-part of Ser. No. 739,311, Aug. 1, 1991, Pat. No. 5,233,914.

[51] Int. Cl.$^6$ ............................................. A47J 31/22
[52] U.S. Cl. ...................... 99/282; 99/305; 99/283
[58] Field of Search .............. 99/280, 281, 282, 283, 99/307, 279, 295, 306, 304, 305, 312, 316

[56] References Cited

U.S. PATENT DOCUMENTS

| | | | |
|---|---|---|---|
| 2,661,015 | 12/1953 | Allred et al. | 137/353 |
| 3,231,713 | 1/1966 | Menuto | 219/202 |
| 4,151,790 | 5/1979 | Spirk | 99/281 |
| 4,382,402 | 5/1983 | Alvarez | 99/295 |
| 4,875,408 | 10/1989 | McGee | 99/283 |
| 5,233,914 | 8/1993 | English | 99/282 |

Primary Examiner—David A. Scherbel
Assistant Examiner—Reginald L. Alexander
Attorney, Agent, or Firm—Oldham, Oldham & Wilson Co.

[57] ABSTRACT

A portable beverage brewing device for brewing a single cup or other individual portion of a beverage in an automobile, boat, van, or other vehicle without distracting attention from driving or operating responsibilities. An anchored mounting base, a leveling plate and a clamp together support a coffee maker body in level position. The body includes a water reservoir, a brewing chamber, a drinking cup, and a drip cup or cupholder. A brewing chamber holds a prepackaged filter containing beverage precursor particles. A water reservoir is removable and resealable. A positive displacement pump, driven by a permanent magnet motor pumps water from the water reservoir through an electric heater to the brewing chamber. Operation of the motor and the pump commences only when water has been heated to a predetermined brewing temperature. An encoder counts the number of revolutions of the motor and shuts off the device when a predetermined number of revolutions have been counted and correspondingly a predetermined volume of water corresponding to an individual portion of brewed beverage has been pumped.

27 Claims, 3 Drawing Sheets

PORTABLE BEVERAGE BREWING DEVICE

CROSS REFERENCE TO PREVIOUSLY FILED APPLICATIONS

This application is a continuation-in-part of application Ser. No. 08/103,860, filed Aug. 9, 1993, now abandoned, which in turn is a continuation-in-part of application Ser. No. 07/739,311, filed Aug. 1, 1991, now U.S. Pat. No. 5,233,914, issued Aug. 10, 1993, and entitled *In-Car Coffee Maker.*

FIELD OF THE INVENTION

This invention relates to an improved, downsized, lightweight, portable device for brewing coffee or other beverages in vehicles, boats, motel/hotel rooms or similar locations where brewed beverages are not customarily available. More specifically, the device is completely self-contained, and it is designed to be anchored and leveled on an uneven surface, then actuated for automatically brewing a cup or other individual portion of a beverage. Safety features include a safety switch mechanism, which prevents commencement of the brew cycle unless a splashproof drinking cup is applied against the main body of the coffee maker, for avoidance of driver distraction and spills.

BACKGROUND OF THE INVENTION

Numerous brewing devices for use in motor vehicles have been disclosed in the past. Some of the former devices are completely portable as that disclosed in U.S. Pat. No. 4,382,402, to Donald E. Alvarez, wherein a portable coffee maker in a moving vehicle brews one cup of coffee at a time to avoid distracting the driver.

Other prior art prior beverage makers for motor vehicles had components which were integral to the motor vehicle itself. For example, in U.S. Pat. No. 2,661,015, to W.R. Allred, et al, a hot water tank is disposed in the engine compartment of the vehicle and a water heating coil within the tank is connection into the hot water system of the vehicle.

U.S. Pat. No. 3,231,713 to A. Menuto, likewise discloses an apparatus for heating water and the like for domestic purposes in automotive vehicles. The water supply and heating tanks are located within the engine compartment and there is a faucet and sink in the passenger compartment.

U.S. Pat. No. 4,151,790 to David J. Spirk, discloses a coffee maker having a built-in reservoir and thermostatically controlled shut-off means to shut off power to the coffee maker when the heating chamber is at an excessive temperature.

In the patent to Spirk, No. 4,151,790, the water reservoir is not removable, thereby requiring that the entire coffee maker be turned upside down to drain the reservoir. The Spirk invention does not have a cup interlock to ensure that the drinking cup is in place as the cycle activates. Also, the Spirk patent '790 does not have anchoring or leveling means or a display to signal the user at the end of the cycle to remove the brewed cup.

U.S. Pat. No. 4,875,408 to McGee discloses a beverage maker for use in vehicles having a brewing chamber made functional by temperature sensitive shape memory alloys for raising and lowering the brewing chamber. There is a disposable brew basket formed of a filter-like pouch or bag containing ground, instant or granular coffee, or other beverage making material, sealed within the brew basket by cover sheets of vapor impermeable material. And a drinking cup is provided with a removable cover actuatable by a movable cup handle, and when the cup is inserted into the beverage maker system the cup handle opens the cover and simultaneously starts a water heater and controls flow of heated water to the beverage brewing chamber.

However, the disclosures contained in each of the foregoing patents have been found to be unsatisfactory in many respects, among others, that the prior coffee makers were not adapted to be anchored against movement to avoid the effects of motion and vibration, were not adapted to be leveled upon an uneven floor or surface, and were not sufficiently sturdy.

Additionally, the water reservoir or other water container in the prior art automotive beverage makers were not capable of being removed from the brewing device for cleaning or refilling. Also, many in-car brewers were not fully automated, were too large and not relatively sizeable or compact for beneficial use in a motor vehicle, and the components were too expensive and not commercially feasible.

OBJECTS OF THIS INVENTION

In view of various drawbacks and deficiencies in the prior art coffee makers, it is a general object of the present invention to provide an anchoring means to stabilize the coffee maker on the floor of a motor vehicle.

A further object is to provide a means to level the coffee maker upon an uneven surface or floor of a motor vehicle.

Another object of the invention is to provide a coffee maker having a removable and resealable water reservoir, whereby the reservoir can be removed from the device, cleaned and refilled, and replaced in the coffee maker, the resealability thereby preventing spillage of water due to motion or vibration of the motor vehicle.

Another object of the invention is to automatically heat a volume of liquid substantially equal to a single portion of a brewed beverage and dispense it to a brewing chamber, where the hot liquid flows through a prepackaged filter containing particles of coffee or other beverage precursor, whereupon the brewed beverage flows by gravity from the brewing chamber to a drinking cup.

An important objective of this invention is to provide an interlock mechanism associated with a drinking cup, so that if the drinking cup is not in proper position adjacent the coffee maker, then the brewing cycle cannot commence.

Yet another object of the invention is to provide a signaling means to notify the user when a brewing cycle is concluded and the brewed cup may be removed.

These and other objects and advantages of the present invention will be made more apparent as the specification proceeds.

SUMMARY OF THE INVENTION

The portable beverage maker of this invention provides a means for accurately measuring and heating a predetermined volume of water corresponding to a desired portion size of brewed beverage. A small positive displacement pump powered by a permanent magnet motor and a pump diaphragm effectively controls liquid volume transfer from a reservoir to a heater. An encoder counts revolutions of the motor and shuts down the coffee maker when a predetermined count, corresponding to a predetermined volume of water for brewing, has been reached. A temperature sensor, e.g. a thermistor, measures output temperature to control pump motor speed and prevent overheating by increasing liquid displacement. The portable beverage maker of this invention further includes an adjustable mount having a base and a leveling plate adapted to be secured when the device maker is leveled. Carpet anchors are positioned around the periphery of the base for anchoring the base, thereby effectively anchoring the beverage maker.

The beverage maker includes a body having a bottom portion, a center partition, and a top. The body or housing retains a brewing chamber in position above a drinking cup, the chamber dimensioned to receive and hold a filter packet containing beverage precursor particles. A liquid container or reservoir is removable for cleaning and refilling, then reinsertion and resealing in the device.

An electronic safety control switch prevents the device from operating if a drinking cup is not in place.

Stamped and formed copper plate pieces form a heating cavity. A nickel-chromium resistance wire wrapped over a mica insulator strip is positioned within the heating cavity to form the heater element.

DETAILED DESCRIPTION OF THE INVENTION

This invention will be described in detail with particular reference to a preferred embodiment thereof. A preferred use of the portable beverage brewing assembly of this invention is as a portable coffee maker for automobiles and other vehicles.

Figure 1:
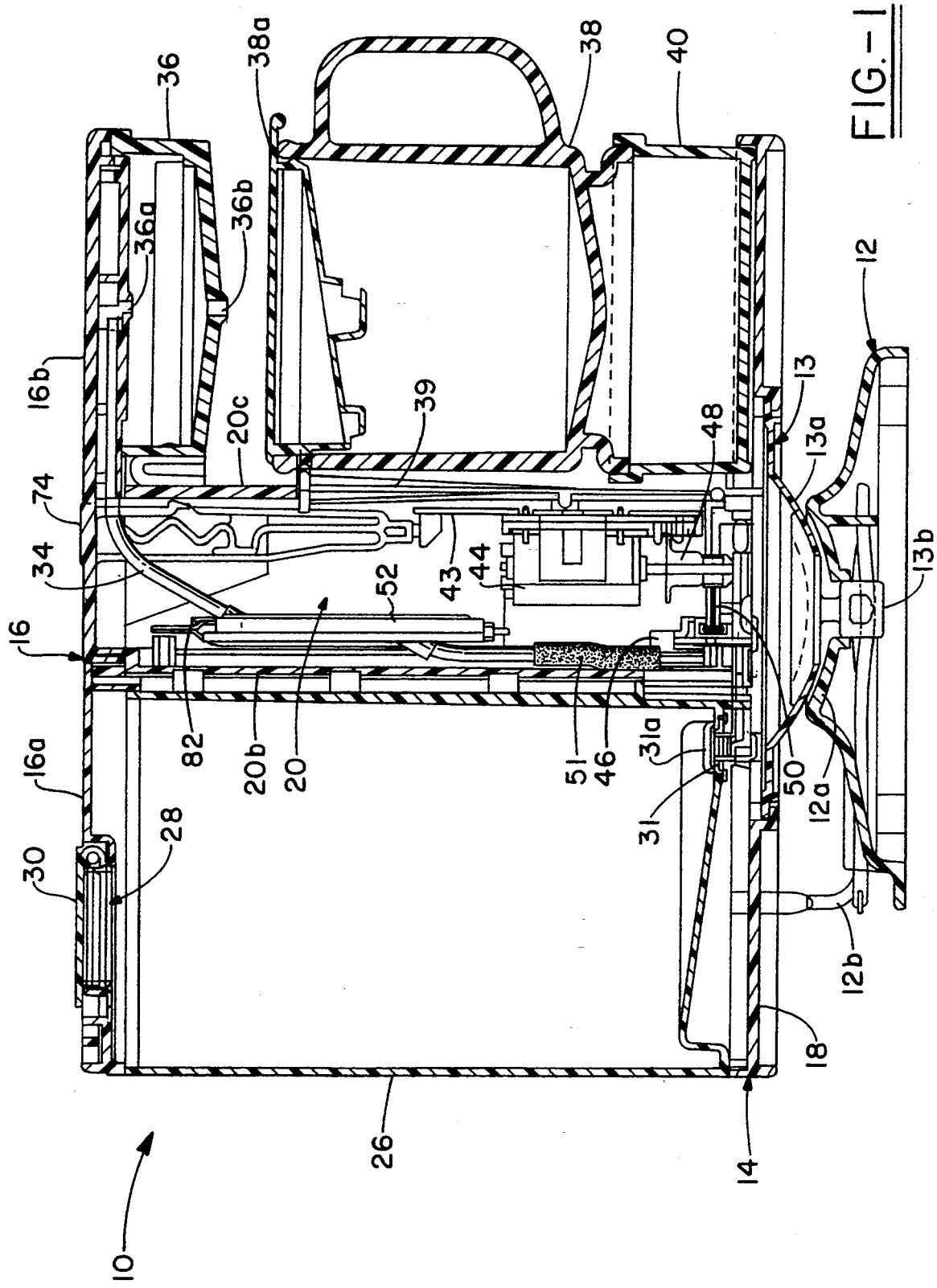
FIG. 1 is a longitudinal vertical sectional view of the body portion of the beverage maker assembly of the subject invention in assembled, operative array.
Figure 2:
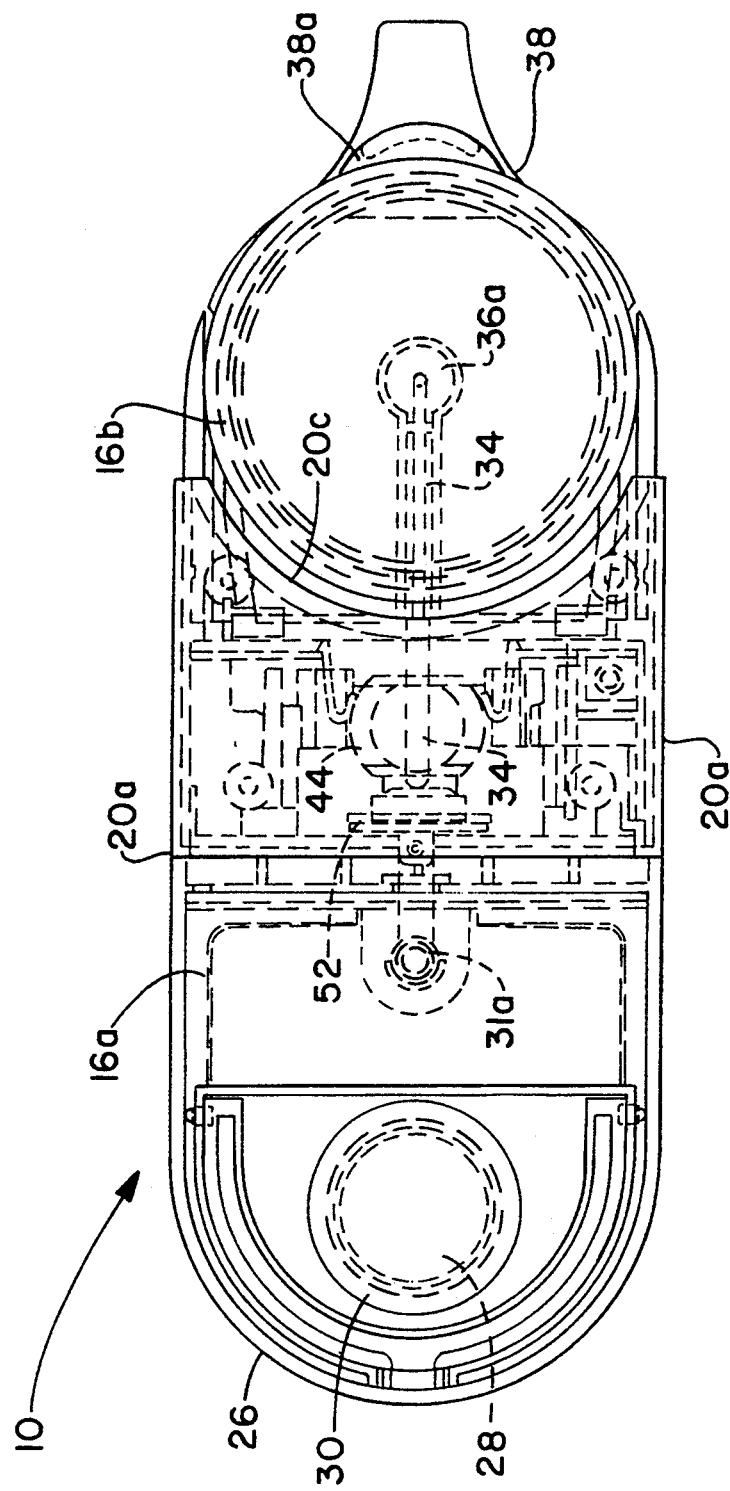
FIG. 2 is a top plan view of the bottom of the body portion of the assembly.

Referring now to the drawings and especially to FIGS. 1 and 2 thereof, the device of this invention is a portable beverage brewing assembly 10 comprising a mounting for base (or swivel base) 12, a leveling plate (or swivel plate) 13, and a generally oval-shaped body 14 which is releasably secured to the leveling plate 13. Body 14 comprises a two-piece top 16 having a reservoir cover 16a and a cover 16b for a brew basket to be described, a one-piece oval-shaped bottom plate 18, and an essentially vertical housing or centerpiece 20 which extends from the bottom plate 18 to the top 16, and from side to side in the center portion of the body 14.

Housing 20 comprises a pair of parallel vertical walls 20a extending in the longitudinal direction of body 14, an essentially flat vertical transverse partition 20b, and a transversely extending arcuate vertical wall 20c.

Base 12 is adapted to be removably anchored to a carpeted portion of a motor vehicle as will be described hereinafter in greater detail. Leveling plate 13 is releasably and adjustably secured to the base 12 in level position as will be hereinafter described in further detail, and permits the coffee maker body 14 to be installed in level position even when the base 12 is not level, due to irregularities in the vehicle carpet or other vehicle anchoring member. The bottom 18 of the brewing assembly (or coffee maker) body 14 is removably secured to the mounting plate 13, so that the swivel plate 13 and coffee maker body 14 are adjusted as a unit to assure level positioning of the coffee maker body.

Body 14 is preferably essentially oval-shaped as shown in FIG. 2. That is, it is shaped like a racetrack, having two opposite parallel sides and two opposite semi-circular ends. Body 14 is of essentially uniform size and shape over its entire height, as seen in FIG. 1.

Body portion 14 includes a liquid reservoir 26, which is removably supported on bottom plate 18. Reservoir 26 has two opposite parallel and vertical sides, a third vertical side which is perpendicular to the first two (and which forms one end of the reservoir), and a semi-circular vertical end wall (at the second end of the reservoir), as best seen in FIG. 2. The first two side walls and the semi-circular end wall form exterior wall surfaces of the body portion 14. Liquid reservoir 26 has a top opening (or first opening) 28 to permit pouring of a liquid (usually water) into the reservoir, and a cap 30 to close and reseal the top opening 28. Reservoir 26 also has a second opening 31 at the reservoir bottom. This opening is sealable by means of a one-way reservoir outlet valve 31a. Opening 31 is adapted to receive one end of a liquid connector or tube 32. Valve 31a has a lip seal which seals around the tube 32 when such tube is inserted into opening 31 and to close opening 31 to prevent water from leaking from reservoir 26 when no tube is inserted.

A liquid connector or tube 32 is sealingly connected to the reservoir outlet valve 31a which controls the reservoir outlet opening 31. Outlet valve 31a is closed whenever reservoir 26 is not in place in the coffee maker. When reservoir 26 is assembled in place, outlet valve 31a is automatically opened, but functions as a check valve to prevent back flow of water.

Water withdrawn from the reservoir 26 is directed through connector 32, thence through a pump and a heater (both to be described in detail subsequently). The heated liquid is then directed through a hot water tube 34 to a brewing chamber or basket 36 where the heated liquid mixes with beverage precursor particles (not shown) contained in a pre-packaged filter (not shown). The pre-packaged filter can be in the form of a disc. Brewing chamber 36 is removable to permit cleaning and changing of beverage precursor particles.

Brewing chamber 36 is of circular cross-sectional shape (see FIG. 2) and includes an upper inlet opening 36a and a lower outlet or discharge opening 36b, both of which are centrally located (i.e. on the central area of brewing chamber 36). Water flows from hot water tube 34 into brewing chamber 36 through inlet opening 36a, and brewed beverage is discharged into a drinking cup 40 through outlet opening 36b.

A drinking cup 38 having a lid 38a is positioned below the brewing chamber to receive the brewed beverage. A cup interlock actuator 39 is provided so that the electrical system will operate only when cup 38 is in place. A cupholder or drip cup 40 is also provided for positioning below the drinking cup for any excess hot liquid or beverage which might escape the drinking cup. Cupholder 40 also catches any drip from brewing chamber 36 when drinking cup is not in place, and serves as storage for used discs which have been used for brewing. Both drinking cup 38 and drip cup (or cupholder) 40 are removable.

Drinking cup 38 may have any desired capacity, usually from one to eight cups. A cup may be defined in terms of a standard coffee cup having a volume of about 5.5 to about 6 ounces.

Housing or centerpiece 20 is situated between the reservoir 26 on the one hand and the brewing chamber (or brew basket) 36, drinking cup 38 and drip cup 40 on the other. Brewing chamber 36, drinking cup 38, and drip cup 40 are axially aligned. Reservoir 26 is at one end of coffee maker body 14 in the longitudinal direction. The brewing chamber 36, drinking cup 38, and drip cup (or cupholder) 40 are at the other end in the longitudinal direction; and centerpiece of housing 20 is in the middle.

A power circuit 42 controls power supply to the coffee maker. Except for internal connections (e.g. a start actuator button and a connection to a power source), the components of power circuit 42 are housed in housing 20. The electronic components are preferably contained on a vertical printed circuit (PC) board 43 which is inside housing 20.

Power circuit 42 includes a motor 44 which actuates a pump 46. Pump 46 pumps water from the reservoir 26 to the brewing chamber 36. This will be described in detail subsequently with reference to FIG. 3.

Downsizing of this beverage brewing device required that the motor 44, connected into the power circuit, be as small as possible. A permanent magnet motor 44 has been found most preferable for fulfilling this requirement.

The motor 44 drives an eccentric cam 48 which is rotatably mounted on the motor shaft to be rotated by the motor is in a preferred embodiment. The axes of motor 44 and eccentric cam 48 are parallel and 0.015 inch apart. Eccentric cam 48 in turn drives a connecting rod 50, which in turn drives pump 46. A first end of connecting rod 50 is mounted on the cam 48. A second end of connecting rod 50 is connected to a diaphragm which forms part of positive displacement pump 46.

Pump 46 is a variable volume positive displacement pump that is adapted for expansion and contraction. Preferably pump 46 is a diaphragm pump. However, any pump that pumps a volume of water which is proportional to the number of revolutions of motor 44 can be used. Such pumps are known as controlled volume pumps, metering pumps, or proportioning pumps. Pump 46 may have a therein a reciprocable diaphragm (not shown) which provides a variable volume chamber. Connecting rod 50 controls actuation of the diaphragm. An inlet port and an outlet port, both of which are provided with check valves (which may be reed valves), communicate with the pump chamber. These valves are adapted to open and close automatically for admitting and ejecting liquid from the pump concomitant with back and forth movement of the diaphragm. The inlet port receives water from the connector 32. Reciprocation of the diaphragm with movement of the connecting rod 50 effectively expands and contracts the volume of the pump chamber causing water to be pumped from reservoir 26 through connector 32, pump 46, flexible tubing 51, heater 52, and hot water tube 34 to brewing chamber 36, as shown in FIG. 1. Heater 52 is mounted above pump 46, in an elevated position relative to pump 46 and to bottom 18 of the coffee maker body 14, so that water must be pumped upwardly from the outlet of reservoir 26 to the hot water tube 34 and brewing chamber 36.

The heater 52 may comprise a heater element (or resistance heater assembly) constructed of one or more metallic pieces which form one or more enclosed heating cavities for passage of the liquid through the cavity and concomitant heating of the liquid. The heater element may comprise a heater inlet assembly and a heater outlet assembly. An O-ring may be provided to form a seal and a passageway for water through the inlet and outlet assemblies.

The heater element is preferably formed of copper and, more preferably, the copper forming the heater element may be furnace brazed copper. The copper surface may be flackened to improve radiant heating and overall efficiency. The resistance wire is preferably constructed of a nickel chromium alloy which is known as NICHROME ®. NICHROME is a registered trademark of Driver-Harris Company, Harrison, New Jersey, and covers resistance alloys and resistance wires. NICHROME is an alloy which, according to *The Condensed Chemical Dictionary*, 10th ed., 1981, published by VanNostrand Reinhold Company, contains 60% nickel, 24% iron, 16% chromium, and 0.1% carbon and is used principally for electric resistance purposes.

In the preferred embodiment of the invention, the resistance wire is wrapped over an insulator effectively preventing contact between the wire and metallic pieces forming the heating element. A mica strip or board has been found to be preferable for use as such insulator. Two additional mica strips insulate the resistance wire from mating copper surfaces, so that heat is distributed evenly and hot spots are avoided. Such hot spots could result in flash boiling of water.

Also, in the preferred embodiment, heating cavities (not shown) are formed in the metallic pieces as narrowed tubules or tubing portions which traverse the heater element, the tubing portions making at least one pass through the element for rapid heating of the liquid in the element. Water is directed through the tubules positioned on both sides of the resistance wire. A three pass system of tubules, wherein the water enters the element, makes two passes on one side of the resistance wire, and then travels to the opposite side of the element to make a final pass and traverse across the area adjacent the resistance wire before exiting the element. The mica insulator with NICHROME ® resistance wire wrapped within the insulator is positioned within each of the cavities of the heater element.

It will be understood that the foregoing description of heater 52 is by way of illustration and that other heater structures which meet both the space limitations and the heating output requirements of this invention can be used.

The device heats a liquid to a temperature in a range from about 195° to about 205° within about five minutes with reduced power usage. The coffee maker utilizes approximately 150 to 160 watts power by use of the heater element disclosed herein.

The use of copper for construction of the heater element has been found preferable over aluminum and other materials. Copper has a thermal conductivity essentially twice that of aluminum, and although copper is somewhat heavier, the small size of the element results in only a signal difference in overall weight.

In a preferred embodiment, motor 44, pump 46, and heater 52 are housed in housing 20. Heater 52 may be mounted on a surface of partition 20b.

Figure 3:
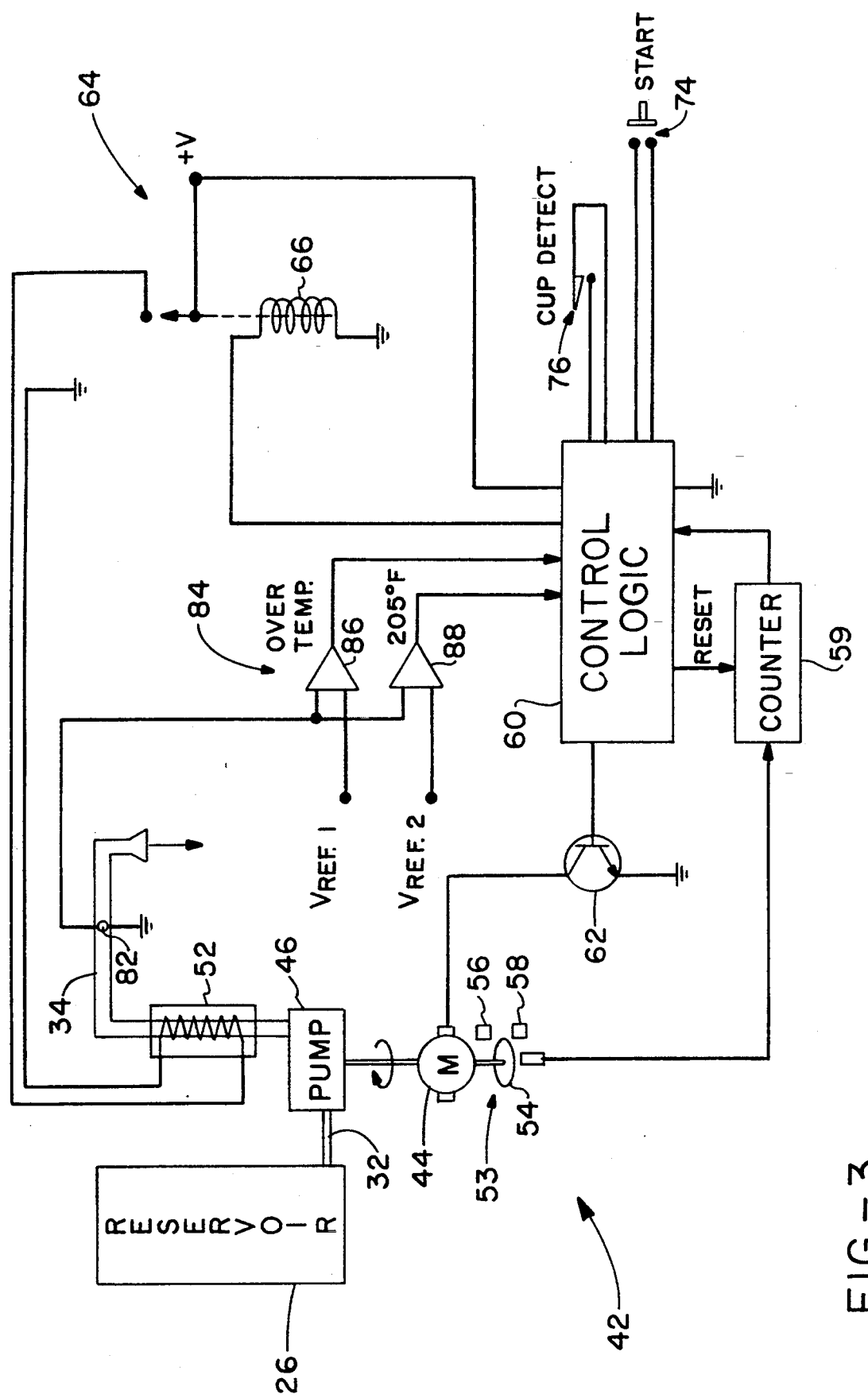
FIG. 3 is a schematic electrical diagram of the beverage brewing assembly of this invention.

The volume of liquid to be brewed is controlled by means of an encoder 53 (shown in FIG. 3). The encoder 53 may include a notched and flattened disc 54 mounted on the motor 46 for rotation therewith. The disc includes one or more small apertures, e.g. notches or holes, (not shown) through it so that light is permitted through the disc while it rotates. A light emitter 56

(which may be infrared or IR) is mounted on one side of the disc 54 and positioned to emit light through a notch in the disc; and a light detector 58 is mounted near the opposite side of the disc and is positioned to detect the light emitted through the one or more disc notches. The light emitter and light detector work in conjunction with a counter 59 for counting revolutions of the disc, concomitant strokes of the connecting rod, and consequently to measure and control the volume of water pumped.

No measuring chamber for water is necessary in the coffee maker of this invention, because the volume of water pumped is directly proportional to the number of revolutions of the disc and motor 44.

The brewing assembly includes a means for controlling temperature of the heater element which means is associated with the heater element. The preferable means for controlling temperature is an electronic temperature sensor 82 positioned at the outlet end of heater 52 to sense liquid temperature output from the heater. The motor speed increases, and consequently pump speed increases, for bringing more liquid to the heater element when the liquid temperature exceeds a predetermined temperature. Similarly, motor speed and pump speed are decreased if the liquid temperature drops below a predetermined temperature. The preferred temperature sensor for this beverage making assembly is a thermistor.

The preferred means for removably anchoring the base 12 comprises a plurality of carpet anchors which interconnect the base with the carpeted portion of a motor vehicle. Those anchors are insertable in the base which has a plurality of apertures on its periphery. Each of the carpet anchors is generally L-shaped, with a threaded leg portion suitable for insertion in apertures of the base; while a pointed foot portion of each anchor is adapted for insertion through carpeting of a motor vehicle. Thumb nuts are included to secure the threaded leg portions of each of the carpet anchors tightly to the base. The apertures are preferably at each of the four corners of the mounting base 12. Base 12 is typically essentially square or rectangular. Thumb nuts may be comprised of nylon or a metallic material, but preferably are comprised of polycarbonate material. The carpet anchors may be plastic or metallic, preferably steel. The carpet anchors and thumb nuts, and the means for anchoring base 12 to a vehicle floor, may be similar to these described in U.S. Pat. No. 5,233,914.

Base 12 and leveling plate 13 have complimentary spherically curved portions of similar radius of curvature which permit the leveling plate 13 and an attached coffee maker body 14 to be mounted in level position even when the base 12 is not level. The mating spherically curved portions from a joint of the ball and socket type. The spherically curved portions of base 12 and leveling plate 13 have center axes which may be aligned or deposed at an acute angle relative to one another, as required to mount coffee maker body 14 in level position. In a preferred embodiment, the acute angle between the respective axes may range up to 12°. A rubber washer (not shown) may be affixed to the spherically curved surface of base 12 to improve friction while reducing clamping forces.

Referring to FIG. 1, base 12 has a raised central portion. There is a centrally located spherically curved depression 12a within the area of and in the raised portion. An opening or aperture in the center of the hemispherical depression is provided for the receipt of a clamp which holds the base 12 and the leveling plate 13 together. Base 12 also has a latching lever 12b that locks leveling plate 13 in place once any required adjustment of the leveling plate 13 and a coffee maker body 14 secured thereto has been made.

Leveling plate 13 has a centrally located spherically curved protrusion 13a which is adapted to be fitted into and rotatably mounted upon the corresponding spherically shaped depression 12a in the base 12. The spherically curved protrusion 13a of leveling plate 13 has a central aperture which is adapted to coincide with a similarly central aperture in the spherically curved portion 12a of base 12. The coffee maker body 14 may be removably secured to leveling plate 13 by means of a tongue and groove mounting structure which is generally similar to that shown and described in applicant's U.S. Pat. No. 5,233,914.

A clamp 13b holds base 12 and leveling plate 13 together in desired position. Clamp 13b includes a spherically curved portion which engages a top surface of spherically curved portion a 13a of leveling plate 13, thereby frictionally clamping the spherically curved portion 13a of leveling plate 13 in place against the spherically curved portion 12a of base 12. Clamp 13b further includes an axially disposed depending portion that extends downwardly from the spherically curved portion of the clamp. This depending portion extends through the central apertures in the spherical portions 12a and 13a of the mounting base 12 and leveling (or mounting) plate 13, respectively. Latching lever 12b engages the depending portion of clamp 13b and locks an assembly comprising base 12, leveling plate 13 and body 14 in place. In the preferred embodiment, the leveling plate 13 has a peripheral portion 13b of generally square shape surrounding the central spherically curved portion 13a. In this embodiment, there is a grooved section formed on the lower surface of the bottom plate 18 of the coffee maker. The sides of the grooved section are spaced apart to receive the leveling plate. The leveling plate is designed to slide into the grooves in the bottom plate 18 of the coffee maker main body 14. The bottom plate 18 of body 14 may be releasably secured to the leveling plate 13 by any desired means, as for example, a latch (not shown) which retains the bottom plate 18 of the coffee maker in position on the leveling plate 13.

Power for power circuit 42 may be supplied from a power source by means of an electrical connector (not shown), which may be conventional. The electrical connector has two ends, the first end connecting to the coffee maker and the second end of the connector adapted to be plugged into the cigarette lighter of a motor vehicle for providing electricity to the device. The coffee maker may have a conventional two-prong plug in which one prong serves as a hot wire and the other serves as a ground wire. The power source may be an automotive vehicle battery, which is typically a 12-volt DC (direct current) source.

Power circuit 42 will now be described in detail with reference to FIG. 3. Power circuit 42 includes a motor 44 for driving pump 46, and resistance heating elements which are components of heater 52, as described earlier. The electrical circuits for motor 44 and for heater 52 are in parallel as shown in FIG. 3.

An encoder 53 and a counter 59 associated therewith have been described previously. A signal representing a count of revolutions of motor 44 is supplied by counter 59 to control logic 60. When the count reaches a predetermined volume of water to be pumped, control logic 60 supplies a signal via diode 62 to motor 44, shutting down the motor and terminating a brewing cycle. Control logic 60 resets counter 59 simultaneously. Control logic 60 is connected to a DC power source +V.

The power circuit 42 further includes a heater circuit 64, which is in operation at full line voltage (+V) throughout a brewing cycle. Heater circuit 64 includes a terminal +V for receiving power from a power source and a ground GND (terminal +V and ground GND may be the hot wire prong and the ground wire prong, respectively, of a coffee maker plug). Heater circuit 64 further includes a relay 66 which is connected to control logic 60. Relay 66 is energized so that the heater circuit 64 is closed and heater 52 is turned on whenever the power circuit 42 is in operation.

An on-off push button switch 74 initiates operation of the coffee maker. This push button may be located on top of the coffee maker, i.e., on cover 16 as shown in FIG. 1.

An electronic safety control switch 76 provides a safety interlock so that a brewing cycle cannot commence if a drinking cup 38 is not in place. Power circuit 42 further includes a temperature sensor 82, e.g., a thermistor, which senses water temperature at the outlet of heater 52 (and which has been mentioned previously), and a temperature control circuit 84 which acts in response to a signal generated by temperature sensor 82, to control the speed of motor 44 in accordance with water temperature at the heater outlet. Temperature control circuit 84 includes a pair of amplifiers 86 and 88. Both amplifiers receive a sign from temperature sensor 82 and both are connected to control logic 60. The first amplifier 86 shuts down the electrical system in the event that hot water temperature exceeds a safe limit, say 210° F. (99° C.). This amplifier has a first reference voltage $V_{REF.1}$ applied to it, compares signal voltage from temperature sensor 82 with this first reference voltage, and sends an output signal to control logic 60 to shut down heater 52 by causing relay 66 to open in the event this safe limit is exceeded. The second amplifier 88 has a second reference voltage $V_{REF.2}$ applied to it, compares signal voltage from temperature sensor 82 with this second reference voltage, and sends an output signal to control logic 60 to speed up motor 44 and thereby pump water through heater 52 faster, in the event the hot water temperature at the outlet of heater 52 exceeds a desired maximum operating temperature, say 205° F. (96° C.) but does not exceed the safe limit (say 210° F.). When the hot water temperature at the outlet of heater 52 is in normal brewing temperature range, i.e., at or below the desired maximum operating temperature (say 205° F.) which actuates the second amplifier 88, the motor 44 rotates at its normal speed, causing pump 46 to pump water through heater 52 at a normal flow rate.

A visual indicator, e.g., a light emitting diode (LED) or other indicator lamp, may be provided. Such visual indicator is illuminated when the power circuit 42 is in operation. Circuitry which will cause the LED to flash upon completion of a brew cycle may be provided.

Operation of the coffee maker will now be described. First, the coffee maker body 14 is leveled if necessary. Then all removable parts are assembled in place. When drinking cup 38 is in place, safety switch 76 is closed. Reservoir 26 is filled with water and then put in place. Reservoir 26 preferably has a fill line marked thereon. If the coffee maker body 14 is not level, the water level in reservoir 26 will be at an angle to the fill line. Thus user levels the coffee maker body. When a water-filled reservoir 26 is put in place, reservoir outlet valve 31a opens.

Next, a connector is connected to terminals of the power supply circuit 42 (i.e., a coffee maker plug) and to a power source, e.g., an automobile cigarette lighter, which is connected to an automobile battery.

Operation of the coffee maker is then initiated by pushing push button switch 74. An indicator lamp turns on, showing that the electrical system is in operation. Electric current flows through the heating elements of heater 52, so that heating of water commences. Motor 44 and pump 46 are actuated by control logic 60 to cause the motor to turn a predetermined number of revolutions (say 200 strokes) which pumps into a heating jacket of heater 52 a predetermined volume of water sufficient to fill the heating jacket. The motor 44 and pump 46 are then shut down by control logic 60 while the heater 52 continues to heat water. When the thermistor 82 signals that a desired operating or brewing temperature (say 205° F.) has been reached, motor 44 is started. This drives pump 46. Water is pumped from reservoir 26 through connector 32 and pump 46 into heater 52, where it is heated to operating temperature (e.g., 205° F.). Hot water flows from heater 52 through hot water tube 34 and into brewing chamber 36, where a beverage, e.g., coffee, is brewed. Coffee flows by gravity from brewing chamber 36 into drinking cup 38.

If the water temperature at the outlet of heater 52 goes above the maximum normal operating temperature (e.g., above 205° F.), motor 44 speeds up. If the water temperature at the heater outlet goes above over temperature, i.e., a maximum safe temperature (say 210° F.) the entire power circuit 42 is shut down.

Revolutions of motor 44 are counted as the motor turns. This may be done, for example, by means of a rotating disc 54 having a hole, a light emitter 56 and a light detector 58 as previously described. The count is fed to encoder 53 and revolution counter 59. There is a direct correlation between the number of revolutions of motor 44 and the volume of water pumped, since pump 46 is a positive displacement pump. When a predetermined number of motor revolutions has been counted, corresponding to a predetermined volume of water (e.g., one to eight cups) pumped, the brewing cycle is complete and the power circuit 42 is shut down (e.g., by opening control switch 78). Both motor 44 and heater 52 cease to operate. The indicator lamp is extinguished, showing that the brewing cycle is complete.

After brewing cycle is complete and before the next brewing cycle takes place, the reservoir 26, brewing chamber 36 and cup 38 may be removed and cleaned.

While this invention has been described in detail with reference to the best mode and preferred embodiment thereof, variations and modifications can be made without departing from the scope of this invention.

What is claimed is:

1. A portable beverage brewing assembly of the type having a coffee maker containing a base, a body portion comprising a top, a bottom, and a centerpiece, the body portion being removably connected to the base; a liquid reservoir removable from the body portion; a heater communicating with the reservoir for receiving from the reservoir and heating said liquid; a brewing chamber communicating with the heater for admixture of a heated liquid with a prepackaged filter containing beverage precursor particles; a drinking cup positioned below the brewing chamber to receive the brewed beverage; a power circuit to control power supply to the coffee maker, and a thermostatically controlled shut-off means; the beverage brewing assembly further comprising:
- a motor means connected on the power circuit;
- a pumping means actuated by the motor means and communicating with the heater; and
- means for shutting down said pumping means and heater means when a predetermined volume of liquid has been pumped.

2. A portable beverage brewing assembly of the type having a coffee maker containing a base, a body portion comprising a top, bottom, and a centerpiece having a surface, the body portion removably connected to the base; a liquid reservoir removable from the body portion; a heater means communicating with the reservoir for receiving liquid from the reservoir and heating said liquid; a brewing chamber communicating with the heater means for admixture of a heated liquid with a prepackaged filter containing beverage precursor particles; a drinking cup positioned below the brewing chamber to receive the brewed beverage; a power circuit including control switches in series to control power supply to the coffee maker, and a thermostatically controlled shut-off means; the beverage brewing assembly further comprising:
- a permanent magnet motor connected on the power circuit; and
- a pumping means actuated by the motor and communicating with the heater means.

3. A portable beverage brewing assembly of the type having a coffee maker containing a base, body portion comprising a top, bottom, and a centerpiece, the body portion being removably connected to the base; a liquid reservoir removable from the body portion; a heater communicating with the reservoir for receiving liquid from the reservoir and heating said liquid; a brewing chamber communicating with the heater means for admixture of a heated liquid with a prepackaged filter containing beverage precursor particles; a drinking cup positioned below the brewing chamber to receive the brewed beverage; a power circuit to control power supply to the coffee maker, and a thermostatically controlled shut-off means; the beverage brewing assembly further comprising:
- a motor means connected on the power circuit;
- a pumping means actuated by the motor means and communicating with the heater means;
- an eccentric cam rotatably mounted on the motor means for rotation thereby; and
- a connecting rod having first and second ends, the first end being mounted on the cam.

4. The brewing assembly of claim 3, wherein the pumping means comprises a pump with first and second ends and a pump cavity having a volume; the pump adapted for expansion and contraction; the first pump end articulating with the second end of the connecting rod;
- an elastic diaphragm positioned at the second end of the pump; the diaphragm effectively expanding and contracting pump volume by back and forth movement of the diaphragm reciprocating with movement of the rod on the eccentric cam.

5. The brewing assembly of claim 4, wherein the heater comprises a heater element formed of at least one metallic piece with at least one enclosed heating cavity for passage of the liquid therethrough; and, a resistance wire associated with each said at least one cavity of the element for heating the liquid in the at least one cavity.

6. The brewing assembly of claim 5, wherein the heater element is formed of copper.

7. The brewing assembly of claim 6, wherein the copper forming the heater element is furnace brazed copper.

8. The brewing assembly of claim 7, wherein the resistance wire is a nickel chromium alloy.

9. The brewing assembly of claim 5, further comprising an insulator and said resistance wire is wrapped within the insulator.

10. The brewing assembly of claim 9, wherein the insulator comprises a mica strip.

11. The brewing assembly of claim 9, further comprising narrowed tubing portions formed within each at least one metallic piece forming the heating element, the tubing portions making at least one pass through the element for rapid heating of the liquid in the element.

12. The brewing assembly of claim 11, wherein the insulator and the enclosed resistance wire is positioned within each said at least one cavity of the heater element.

13. The brewing assembly of claim 12, wherein the heater element is mounted in said centerpiece in elevated position relative to the bottom of said body portion.

14. The brewing assembly of claim 3, further comprising a means for controlling a volume of liquid to be brewed.

15. The brewing assembly of claim 14, wherein means for controlling the volume brewed comprises an encoder.

16. The brewing assembly of claim 15, wherein the encoder comprises a flattened disc rotatably mounted on the motor means, coaxial with said cam, for rotation thereby, the disc having first and second sides and at least one aperture therein;
- a light emitter means mounted near the first side of the disc and positioned to emit light through said at least one aperture;
- a light detector means mounted near the second side of the disc and positioned to detect the light emitted through said at least one aperture; said light emitter means and light detector means adapted for counting revolutions of the disc, concomitant strokes of the connecting rod, and consequent volume of water pumped.

17. The brewing assembly of claim 15, further comprising a means for controlling temperature of the heater element, said means for controlling temperature being associated with the heater element.

18. The beverage assembly of claim 17, wherein the means for controlling temperature is an electronic temperature sensor positioned to sense liquid temperature output from the heater element, the means for controlling adapted to increase motor speed, and consequent pump speed, for bringing more liquid to the heater element when said liquid temperature exceeds a predetermined temperature.

19. The beverage assembly of claim 18, wherein the temperature sensor is a thermistor.

20. The brewing assembly of claim 4, wherein the pumping means is a positive displacement pump.

21. The brewing assembly of claim 20, further comprising check valves associated with the pump.

22. The brewing assembly of claim 21, wherein said check valves are adapted to open and close automatically for admitting and ejecting liquid from the pump concomitant with back and forth movement of the diaphragm.

23. The brewing assembly of claim 22, further comprising a liquid connector for conveying liquid from said reservoir to said pump; and,
   a reservoir valve positioned at the bottom of the reservoir to sealingly receive the liquid connector.

24. The brewing assembly of claim 5, further comprising:
   a means for removably anchoring the base in a motor vehicle;
   the coffee maker bottom having interior and exterior surfaces and adapted for removal from the base; a grooved section formed on the exterior surface of the coffee maker bottom;
   a leveling plate pivotally mounted on said base for pivoting said plate in relation to the base to a level position; said plate adapted to slidably interfit into said grooved section of the bottom;
   a means for releasably securing said leveling plate on the base in said level position;
   a means for removably fastening said coffee maker bottom to said leveling plate for removal and use of the coffee maker independent of said holder or base; and,
   a means for preventing inadvertent actuation of the coffee maker.

25. The brewing assembly of claim 24, wherein said means for removably anchoring the base comprises a plurality of carpet anchors interconnecting said base with a carpeted portion of a motor vehicle.

26. The brewing assembly of claim 25, further comprising:
   said base having a plurality of apertures on the periphery thereof;
   each of said plurality of carpet anchors having an L-shape, with a threaded leg portion suitable for insertion in said apertures and a pointed foot portion for insertion through carpeting of a motor vehicle;
   a plurality of thumb nuts adapted for securing said threaded leg portion of each of the plurality of carpet anchors tightly to the base.

27. The brewing assembly of claim 24, wherein said means for releasably securing said holder on the base in said level position, comprises:
   said base having a raised section toward a central portion of the base and a spherically shaped depression within the raised section, and a centralized aperture located in the depression, said spherically shaped depression being adapted to interfit with a corresponding hemispheric shaped portion of the leveling plate having a corresponding centrally located aperture in said holder; and, a clamp insertable through said corresponding apertures to frictionally tighten the holder against the base when the coffee maker is pivoted to a level position.

* * * * *